(12) United States Patent
Yang

(10) Patent No.: US 7,287,521 B2
(45) Date of Patent: Oct. 30, 2007

(54) SYSTEM AND METHOD FOR IMPROVED ENGINE STARTING USING HEATED INTAKE AIR

(75) Inventor: Jialin Yang, Canton, MI (US)

(73) Assignee: Ford Global Technologies LLC, Dearborn, MI (US)

(*) Notice: Subject to any disclaimer, the term of this patent is extended or adjusted under 35 U.S.C. 154(b) by 97 days.

(21) Appl. No.: 11/233,179

(22) Filed: Sep. 21, 2005

(65) Prior Publication Data

US 2007/0062178 A1 Mar. 22, 2007

(51) Int. Cl.
*F02B 29/04* (2006.01)
(52) U.S. Cl. .................... 123/556; 123/179.16
(58) Field of Classification Search ............ 123/556, 123/294, 305, 435, 179.16
See application file for complete search history.

(56) References Cited

U.S. PATENT DOCUMENTS

| | | | |
|---|---|---|---|
| 3,500,806 A * | 3/1970 | Moeller et al. | 123/556 |
| 4,099,499 A * | 7/1978 | Giardini et al. | 123/557 |
| 4,374,512 A * | 2/1983 | Starun | 123/556 |
| 4,399,774 A * | 8/1983 | Tsutsumi | 123/41.1 |
| 4,445,480 A * | 5/1984 | Inoue et al. | 123/432 |
| 5,036,668 A | 8/1991 | Hardy | |
| 5,046,473 A * | 9/1991 | Hokenson | 123/556 |
| 5,050,571 A * | 9/1991 | Daniels | 123/557 |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,336,436 B1 | 1/2002 | Miyakubo et al. | |
| 6,386,175 B2 * | 5/2002 | Yang | 123/298 |
| 6,390,054 B1 | 5/2002 | Yang | |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,923,167 B2 | 8/2005 | Flowers | |
| 6,932,175 B2 | 8/2005 | Teraji et al. | |
| 2004/0065279 A1 | 4/2004 | Hitomi et al. | |
| 2004/0182359 A1 | 9/2004 | Stewart et al. | |
| 2005/0121008 A1 | 6/2005 | Kikenny et al. | |
| 2005/0173169 A1 | 8/2005 | Gray, Jr. | |

OTHER PUBLICATIONS

O. Lang et al, "Thermodynamical and Mechanical Approach Towards a Variable Valve Train for the Controlled Auto Ignition Combustion Process," SAE Technical Paper No. Jan. 7, 2005, Apr. 11-14, 2005.

* cited by examiner

*Primary Examiner*—Marguerite McMahon
(74) *Attorney, Agent, or Firm*—Allan J. Lippa; Alleman Hall McCoy Russell & Tuttle LLP

(57) ABSTRACT

A system for an internal combustion engine, the engine having an intake and exhaust manifold, the system comprising of a heat exchanger configured to extract energy from engine exhaust gases; a catalyst coupled between said heat exchanger and the exhaust manifold of the engine; a spark plug in a cylinder of the engine; and a controller to operate the engine to perform spark ignition of a mixture of air and fuel in said cylinder during an engine cold start, where said air is heated with the energy before being inducted into said cylinder.

20 Claims, 2 Drawing Sheets

SYSTEM AND METHOD FOR IMPROVED ENGINE STARTING USING HEATED INTAKE AIR

FIELD

The present application relates to controlling engine operation during engine starting.

BACKGROUND AND SUMMARY

An internal combustion engine may utilize various types of combustion. For example, spark ignition (SI) of a homogenous mixture during the expansion stroke is one example. This method relies on a timed spark from a sparking plug in order to achieve ignition of an air and fuel mixture within the combustion chamber. Another type of combustion is homogeneous charge compression ignition (HCCI), which occurs when the temperature of the air/fuel mixture within the combustion chamber attains the autoignition temperature of the specific fuel. HCCI can be used to provide greater fuel efficiency and reduced NOx production under some conditions.

In one example approach utilizing HCCI combustion, heat exchangers may be used to extract energy from the exhaust to heat intake air and thereby improve overall thermodynamic efficiency. However, the inventors herein have recognized that during engine cold starting, there may be insufficient exhaust gas energy to generate stable HCCI combustion. Further, cold engine conditions, such as cold engine coolant, can further exacerbate cold starting with HCCI combustion.

As such, in one embodiment, a system for an internal combustion engine, the engine having an intake and exhaust manifold, may be provided. The system comprises: a heat exchanger configured to extract energy from an exhaust gas of the engine; a catalyst coupled between said heat exchanger and the exhaust manifold of the engine; a spark plug in a cylinder of the engine; and a controller to operate the engine to perform spark ignition of a mixture of air and fuel in said cylinder during an engine cold start and/or the warm-up process, where said air is heated with said heat before being inducted into said cylinder.

In this way, it is possible to transfer some of the energy from the exhaust gases to the intake air to further promote rapid warm-up of the engine and catalyst, without limiting exhaust energy available to the catalyst. In other words, the exhaust energy can be used to increase the temperature of an air-fuel mixture in the combustion chamber, thereby improving fuel atomization and thereby enabling increased ignition timing retard. Further, the increase mixture temperature may also increase exhaust gas temperature.

DETAILED DESCRIPTION OF THE DRAWINGS

DETAILED DESCRIPTION

Figure 1:
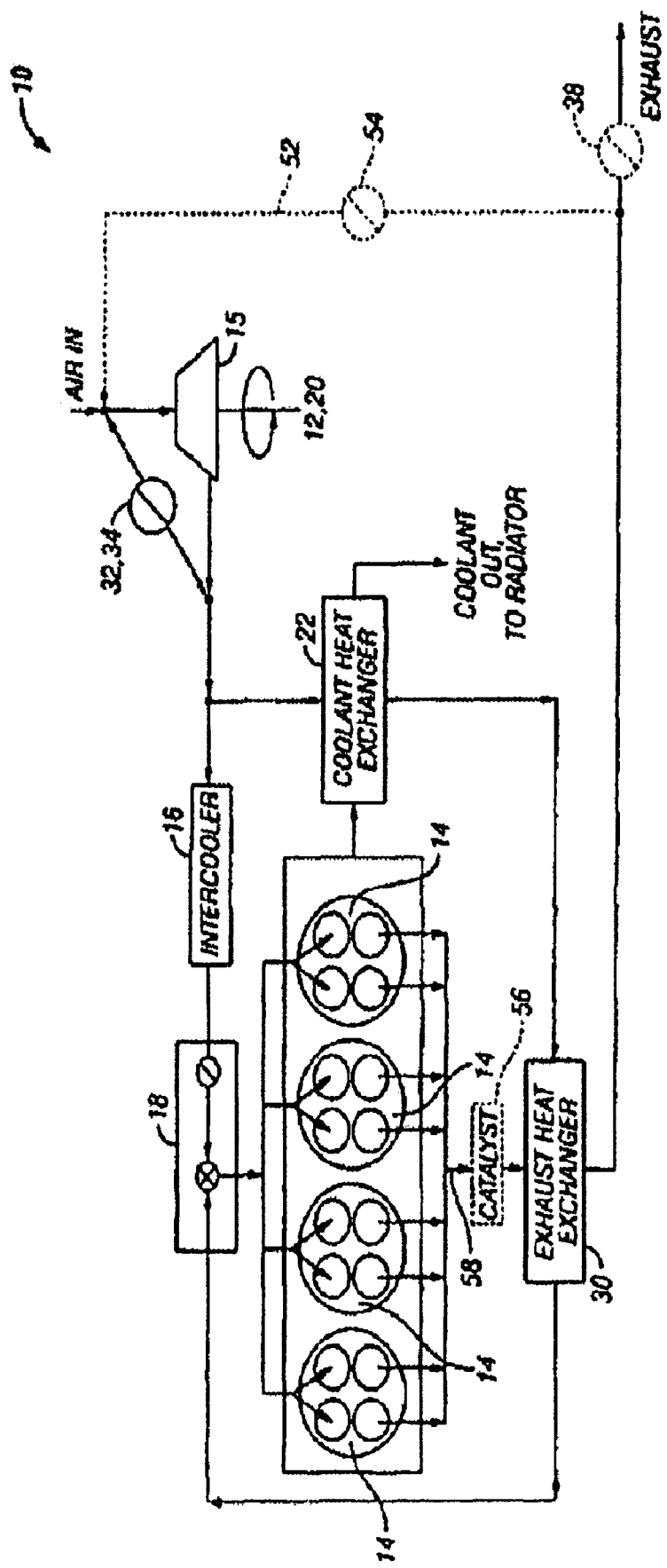
FIG. 1 is a schematic block diagram of an example embodiment of an intake/exhaust system with intake heating.

Referring to FIG. 1, a first embodiment of intake/exhaust system 10 with intake heating, inlet temperature and pressure controls, and intake air pressure boost using a supercharger 12 or an E-booster, are disclosed. For the embodiment of FIG. 1, the compressed intake air via air compressor 15 may include two flow paths (or routes) to engine cylinders 14. The first path may be through an intercooler 16, and then to control valves 18 and engine cylinders 14. Airflow through this path would be unheated air. The second path may be through coolant heat exchanger 22 and exhaust heat exchanger 30, and then to control valves 18 and engine cylinders 14. Various types of heat exchangers may be used, such as air to air or air to liquid. Airflow through this path would be heated air. In some examples, the arrangement of air through either intercooler 16 or through coolant heat exchanger 22 and exhaust heat exchanger 30 would allow low intake temperature operation in SI mode to avoid knocking, and would reserve the thermal energy in the compressed air for HCCI combustion. In other examples, heated intake air may be utilized in SI mode during cold start and/or engine warm-up operations. The mass ratio of the heated and unheated air streams to control valves 18 and engine cylinders 14 may also be varied to control the intake air temperature. In this manner knocking may be avoided through careful control of the combined air intake temperature.

The intake air pressure may be controlled using conventional control valves and air compressor 15. Referring to FIG. 1, if a supercharger 12 is used (i.e. air compressor 15 is mechanically driven by the engine), a pressure release valve 32 may be used and opened when boosting is not needed to control the pressure downstream of supercharger 12. As discussed above, if instead of a supercharger 12 an E-booster is used (i.e. air compressor 15 is driven by an electrical motor), instead of pressure release valve 32, a bypass valve 34 may be used for opening when boosting is not in need and when E-booster is deactivated. Bypass valve 34 may preferably open simultaneously with the deactivation of E-booster 20, and likewise, close simultaneously with the activation of E-booster 20. Intake/exhaust system 10 of FIG. 1 may optionally employ an exhaust gas recirculation (EGR) line 52 and EGR control valve 54. A catalyst 56 may be placed between the engine exhaust port 58 and heat exchanger 30. Various types of catalysts may be used, such as three way catalysts, NOx traps, particulate filters or lean NOx catalysts among others. Further, the catalyst may be in a close-coupled location in the engine exhaust.

For some HCCI engines, a large valve overlap (i.e. the overlap of the intake and exhaust events) is used during HCCI operation. During the application of intake pressure boosting near the high-torque boundary of the HCCI operating region, some fresh air in engine cylinders 14 may flow out to the exhaust port due to the pressure difference. To minimize the associated losses due to such fresh airflow to the exhaust port, the valve overlap may preferably be minimized for applications requiring intake pressure boosting. Alternatively, an exhaust backpressure control valve 38, as shown in FIG. 1, may be applied to raise the exhaust pressures and minimize the loss of fresh air in engine cylinders 14.

However, other configurations of intake/exhaust system 10 may be utilized. For example, for the system described above, three-way control valves may be provided for controlling the mass ratio of air through the throttle to thereby control temperature and pressure of air supplied to the engine. Each of the three way valves may include two input air flow paths and one output air flow path for supplying air to the engine. One of the input air flow paths may receive air controlled by the throttle, the other one of the input air flow paths may receive air from the heat exchanger.

Alternatively, for an engine including at least two intake valves and at least one exhaust valve, the system may include at least one variable valve timing device for controlling at least one of the intake valves to control the mass ratio of air supplied to the intake valves to thereby control temperature and pressure of air supplied to the engine. A first variable valve timing device may control a first intake valve, thereby controlling the supply of air through the throttle to the first intake valve. A second variable valve timing device may control a second intake valve, thereby controlling the supply of air through the heat exchanger to the second intake valve. Alternatively, the system may include at least one port throttle for controlling air flow to at least one of the intake valves to control the mass ratio of air supplied to the intake valves to thereby control temperature and pressure of air supplied to the engine. A first port throttle may control air flow to a first intake valve, thereby controlling the supply of air through the throttle to the first intake valve. A second port throttle may control air flow to a second intake valve, thereby controlling the supply of air through the heat exchanger to the second intake valve.

In another configuration, the system may include at least one additional throttle for controlling air flow to each of the intake valves to control the mass ratio of air supplied to the intake valves to thereby control temperature and pressure of air supplied to the engine. The additional throttle may control air flow through the second air flow path. Thereafter, air within the first and second air flow paths may be mixed and supplied to the intake valves. Alternatively, the additional throttle may control air flow to one of the intake valves to control air supplied to the intake valve and to thereby control temperature and pressure of air supplied to the engine. The additional throttle may control air flow through the second air flow path. Thereafter, air within the first air flow path may be directly supplied to another one of the intake valves.

The invention further provides a method of controlling intake air temperature and pressure in a dual-mode homogeneous charge compression ignition (HCCI) engine having intake and exhaust manifolds. The method may include supplying air to the engine via at least two air flow paths, cooling air in one of the air flow paths and heating air in another one of the air flow paths through the addition of thermal energy. The method may further include controlling the mass ratio of air through the air flow paths to thereby control temperature and pressure of air supplied to the engine, and boosting intake pressure of air supplied to the engine. In this manner, air at a first temperature may be supplied to the engine for operation SI mode and air at a second temperature may be supplied to the engine for operation in HCCI mode.

The method described above may further include utilizing a supercharger for compressing air supplied to the engine and thereby boosting intake pressure of air supplied to the engine, and controlling pressure downstream of the supercharger by means of a pressure release valve. Alternatively, the method may include utilizing an E-booster for compressing air supplied to the engine and thereby boosting intake pressure of air supplied to the engine, and controlling pressure downstream of the E-booster by means of a bypass valve. The bypass valve may be closed upon activation of the E-booster and opened upon deactivation of the E-booster. Alternatively, the method may include utilizing a turbocharger for compressing air supplied to the engine and thereby boosting intake pressure of air supplied to the engine. The method may further include controlling operation of the turbocharger by means of an exhaust bypass valve, located downstream of the turbocharger, operable in conjunction with an intake bypass valve, located upstream of the turbocharger.

The method may further include directing exhaust gas from an exhaust heat exchanger to an air compressor via an exhaust gas recirculation (EGR) line, and controlling flow of exhaust gas through the EGR line by means of an EGR control valve. In another embodiment, the method may include controlling flow of cooled air by means of a throttle, and controlling the mass ratio of air through the throttle by means of a plurality of three-way control valves to thereby control temperature and pressure of air supplied to the engine. Each of the three way control valves may include two input air flow paths and one output air flow path for supplying air to the engine. One of the input air flow paths may receive air controlled by the throttle, the other one of the input air flow paths may receive air from a heat exchanger.

In yet another embodiment, the method may include controlling flow of cooled air by means of a throttle, and controlling the mass ratio of air supplied to at least one of the intake valves by means of at least one variable valve timing device to thereby control temperature and pressure of air supplied to the engine. A first variable valve timing device may control a first intake valve, thereby controlling the supply of air through the throttle to the first intake valve. A second variable valve timing device may control a second intake valve, thereby controlling the supply of air through a heat exchanger to the second intake valve. Alternatively, the method may include controlling flow of cooled air by means of a throttle, and controlling the mass ratio of air supplied to at least one of the intake valves by means of at least one port throttle to thereby control temperature and pressure of air supplied to the engine. A first port throttle may control flow past a first intake valve, thereby controlling the supply of air through the throttle to the first intake valve. A second port throttle may control flow past a second intake valve, thereby controlling the supply of air through a heat exchanger to the second intake valve.

In this manner, the invention shown in FIG. 1 may utilize a first air flow path that directs air to the engine via an intercooler and the second air flow path may direct air to the engine via a heat exchanger, such that air at a first temperature is supplied to the engine for operation during cold start or warm-up in SI mode and air at a second temperature is supplied to the engine for operation in HCCI mode.

In some embodiments of the invention, during engine cold start the method described above may include utilizing SI mode during the initial warm-up period wherein the contribution of air warmed by the heat exchanger is maximized for a desired number of engine cycles until the intake air temperature reaches a temperature substantially near autoignition. Thereafter, the contribution of warmed air may be reduced while simultaneously increasing the contribution of cool/ambient air therefore avoiding engine knock. When the engine and catalyst temperature reach the desired temperature, the contribution of heated air may be increased and a transition to HCCI mode may commence. During HCCI operations the intake air temperature may be regulated by the contribution of cool and warm air in order to reach the autoignition temperature of the charge at a desired combustion timing. Finally, the combustion air-fuel mixture ratio may be lean, rich, or stoichiometric.

In some example, it may be possible to control the amount of heat transfer from exhaust gas to heated intake air, such as by controlling an amount of coolant flow, or amount of cross flow in heat exchanger 30, among others.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine controller.

Figure 2:
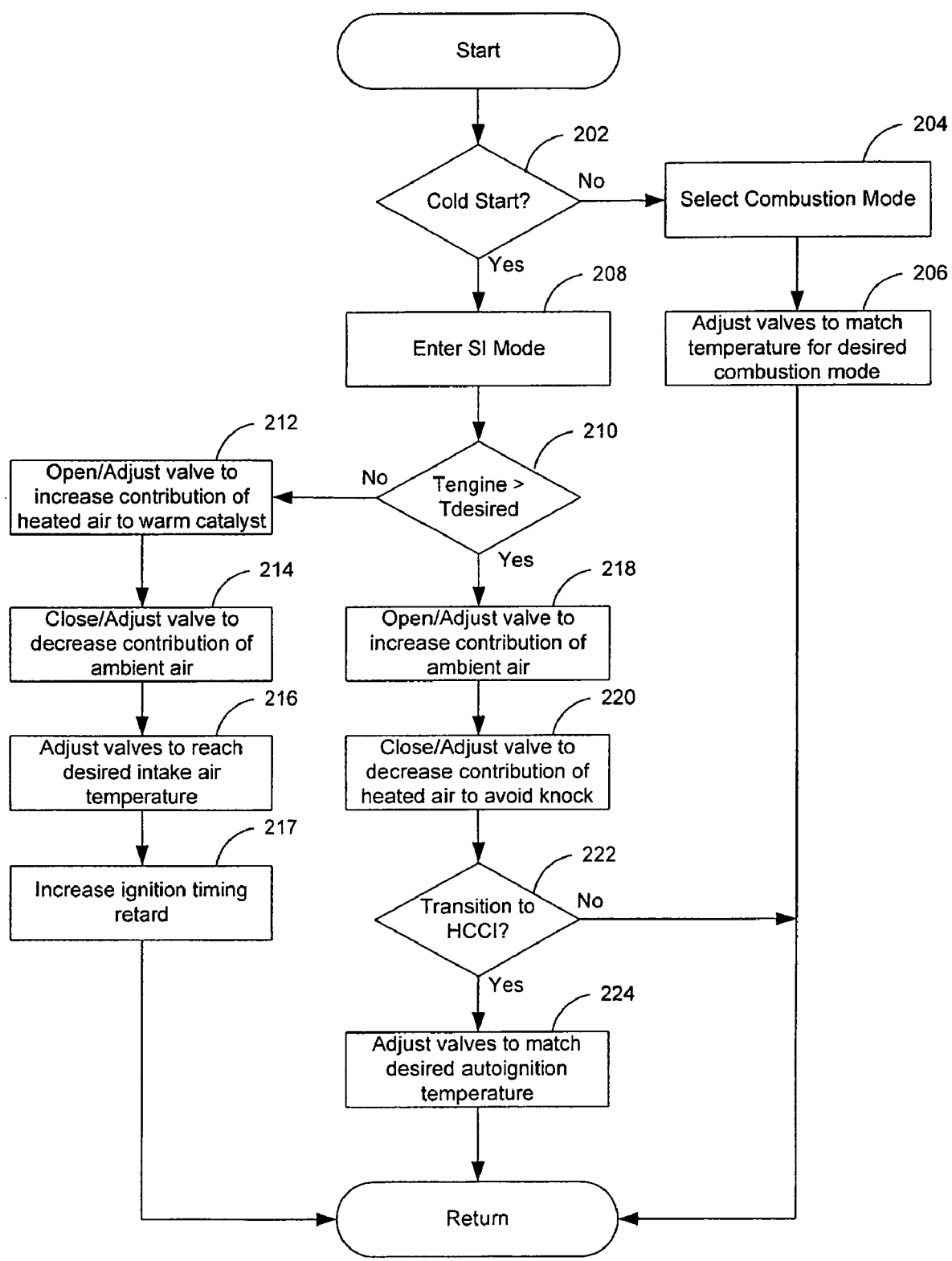
FIG. 2 is a flow chart of an example embodiment for controlling the contribution of warm and cool/ambient intake air.

Referring to FIG. 2, a flow chart of an example method for controlling the contribution of warm and cool/ambient intake air is shown. Beginning at step 202 it is judged whether a cold start and/or warm-up condition exists. If the answer to step 202 is no, the routine proceeds to step 204, where a desired combustion mode is selected. The combustion mode may include homogenous spark ignition operation, or homogeneous charge compression ignition, depending on various conditions such as engine speed, engine load, catalyst temperature, and others. Next, the routine proceeds to step 206, where the contribution of heated and unheated intake air is matched to the operating temperature of the desired combustion mode. From step 206, the routine ends.

Alternatively, if the answer to step 202 is yes, the routine proceeds to step 208 where the SI combustion mode is selected. During engine cold start and warm-up periods, hydrocarbon emissions may be increased due to decreased fuel atomization, and reduced catalyst conversion efficiency. Therefore, it can be desirable to warm the engine and catalyst quickly in order to reduce hydrocarbon emissions, as described below. Also, under some starting conditions, an approximately stoichiometric air-fuel ratio may be combusted. Under other conditions, a lean, or slightly lean, air-fuel ratio may be combusted, such as with one air-fuel ratio of stoichiometry.

Next, the routine proceeds to step 210, where it is judged whether the engine temperature (e.g., exhaust temperature, catalyst temperature, engine coolant temperature, etc.) has reached a desired temperature where the catalyst is sufficiently heated and adequate fuel atomization may occur. In addition, step 210 may also determine whether the exhaust temperature is above a minimum temperature before introducing heated air. Further, the routine may also determine whether the engine has operated for a predetermined number of combustion cycles, or whether the heated air has reached a desired temperature.

If the answer to step 210 is no, the routine proceeds to step 212, where the valve controlling the contribution of warm intake air is opened or adjusted in order to promote rapid warming of the engine and catalyst. Also, if equipped, the routine can also adjust the heat exchanger(s) to increase the amount of thermal energy transferred to the heated intake air. Next, the routine proceeds to step 214, where the valve controlling the contribution of cool/ambient intake air is closed or adjusted in order to decrease the contribution of cool/ambient air, thereby further increasing exhaust gas temperature. Next, the routine proceeds to step 216, where the valves are dynamically adjusted to maintain a desired air intake temperature. In some embodiments of the application, a single shared valve or multiple valves may be utilized to control intake air temperature. Then, in step 217, ignition timing is further retarded as the warm intake air increases in temperature and is increasingly added to the intake manifold. For example, the amount of additional spark retard may be proportional to the amount and/or temperature of warmed intake air added to the cylinders. From step 217, the routine ends.

In this way, it is possible to utilize the thermal energy extracted from the exhaust gas from the initial combustion firings to add thermal energy to the intake air inducted during later combustion events. This increased intake air temperature can enable improved fuel atomization and combustion stability, thereby enabling increased ignition timing retard and increased exhaust temperature. In other words, during conditions where temperature is below the desired temperature, the engine cylinders may be operated with retarded ignition timing to increase exhaust gas temperature, and the amount of retard that can be tolerated may be limited by combustion stability. Thus, the warmed air can increase fuel atomization and vaporization during cold engine conditions, thereby increasing the amount of ignition retard, at least under some conditions. Further, the increased intake air temperature itself can promote increased exhaust gas temperature.

Alternatively, if the answer to step 210 is yes, the routine proceeds to step 218 where the valve controlling the cool/ambient intake air is opened or adjusted to increase the contribution of cool air, and any additional spark retard added from step 217 is ramped out. Next, the routine proceeds to step 220, where the valve controlling the contribution of warm intake air is closed or adjusted to reduce knock during SI combustion mode. If desired, ignition timing retard may also be combined with such control to further reduce knock. Next, the routine proceeds to step 222 where it is judged whether the engine is heated to a temperature sufficient for transition to HCCI mode. If the answer to step 222 is no, the routine ends. Alternatively, if the answer to step 222 is yes, the routine proceeds to step 224, where the air intake valves are adjusted to match a desired temperature or the autoignition temperature. From step 224, the routine ends.

In this manner, rapid heating of the engine and catalyst may occur while simultaneously reducing engine knock when operating in SI mode.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types. Further it could be applied to various types of valve actuators, such as electrically actuated valves, and/or other variable valve timing systems, such as, for example, cam phasing, cam profile switching, variable rocker ratio, etc.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed:

1. A system for an internal combustion engine, the engine having an intake and exhaust manifold, the system comprising:
    a heat exchanger configured to extract energy from an exhaust gas of the engine to intake air;
    a catalyst coupled between said heat exchanger and the exhaust manifold of the engine;
    a spark plug in a cylinder of the engine; and
    a controller to operate to the engine to perform spark ignition of a mixture of said intake air and fuel in said cylinder during an engine cold start, where said air is heated with said energy before being inducted into said cylinder;
    said heated air being increased after exhaust temperature reaches a preselected value and said heated air being reduced after exhaust temperature reaches a second value higher than said preselected value.

2. The system of claim 1, wherein a timing of said spark ignition is retarded in a combustion cycle as an amount of said heated air added to said cylinder increases.

3. The system of claim 1, wherein a timing of said spark ignition is retarded in a combustion cycle as a temperature of said heated air added to said cylinder increases.

4. The system of claim 1 wherein said air is heated with energy from previous combustion of the engine.

5. The system of claim 1 wherein said heated air is added after at least one combustion cycle of the engine.

6. The system of claim 1 further comprising an intercooler coupled to an intake of the engine.

7. The system of claim 6 further comprising a turbocharger coupled to the engine.

8. The system of claim 1 wherein a timing of said spark ignition is retarded in a combustion cycle as a temperature of said heated air added to said cylinder increases.

9. A system for an internal combustion engine, the engine having an intake and exhaust manifold, the system comprising:
    a heat exchanger configured to extract energy from an exhaust gas of the engine;
    a close-coupled catalyst coupled between said heat exchanger and the exhaust manifold of the engine;
    a spark plug in a cylinder of the engine; and
    a controller to operate the engine to perform spark ignition of a mixture of air and fuel in said cylinder during an engine cold start, where said air is heated with said energy before being inducted into said cylinder, said controller further configured to adjust timing of said spark ignition in response to said heated air.

10. The system of claim 9 wherein a timing of said spark ignition is retarded in a combustion cycle as an amount of said heated air added to said cylinder increases and as a temperature of said heated air added to said cylinder increases.

11. The system of claim 10 wherein said air is heated with energy from previous combustion of the engine.

12. The system of claim 11 wherein said heated is added after at least one combustion cycle of the engine.

13. The system of claim 12 wherein said heated air is reduced after exhaust temperature reaches a preselected value.

14. The system of claim 13 further comprising an intercooler coupled to an intake of the engine.

15. The system of claim 14 further comprising a boosting device coupled to the engine.

16. The system of claim 9, wherein said controller is configured to operate the engine to perform compression ignition of a mixture of air and fuel in said cylinder after said engine cold start.

17. A method for controlling an internal combustion engine, the engine having an intake and exhaust manifold, the method comprising:
    directing exhaust gas from a cylinder of the engine to a catalyst;
    directing exhaust gas from said catalyst to a heat exchanger configured to extract heat from said gas and to transfer said heat to an air stream inducted into said intake manifold;
    operating the engine to perform spark ignition of a mixture of air and fuel in said cylinder during an engine cold start, where said air includes air from said heated air stream; and
    adjusting a timing of said spark ignition in response to a temperature of said air and fuel mixture.

18. The method of claim 17 wherein said timing is retarded as said temperature increases, at least under some conditions.

19. The method of claim 18 further comprising operating the engine to perform homogenous charge compression ignition operation under at least some conditions after said cold start.

20. The method of claim 19 wherein said air-fuel mixture is slightly lean of stoichiometry.

\* \* \* \* \*